United States Patent
Suzuki

(10) Patent No.: US 7,339,868 B2
(45) Date of Patent: Mar. 4, 2008

(54) INFORMATION RECORDING METHOD, INFORMATION RECORDING DEVICE, INFORMATION SYSTEM, PROGRAM, AND RECORDING MEDIUM

(75) Inventor: Ryoichi Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 580 days.

(21) Appl. No.: 10/942,807

(22) Filed: Sep. 17, 2004

(65) Prior Publication Data

US 2005/0063290 A1    Mar. 24, 2005

(30) Foreign Application Priority Data

Sep. 19, 2003    (JP)    .............................. 2003-328754

(51) Int. Cl.
G11B 5/09    (2006.01)
(52) U.S. Cl. ................. 369/53.2; 369/47.15; 369/59.1; 369/53.41
(58) Field of Classification Search .................... None
See application file for complete search history.

(56) References Cited

U.S. PATENT DOCUMENTS

| | | | |
|---|---|---|---|
| 5,722,029 A | 2/1998 | Tomidokoro et al. | |
| 5,729,525 A | 3/1998 | Ishida et al. | |
| 5,881,032 A | 3/1999 | Ito et al. | |
| 6,072,759 A | 6/2000 | Maeda et al. | |
| 6,507,412 B1 | 1/2003 | Suzuki | |
| 6,584,278 B2 * | 6/2003 | Ando et al. | 386/98 |
| 6,594,207 B2 | 7/2003 | Suzuki | |
| 6,782,434 B1 | 8/2004 | Suzuki et al. | |
| 2003/0059205 A1 | 3/2003 | Suzuki | |
| 2003/0063545 A1 | 4/2003 | Suzuki | |
| 2003/0193856 A1 | 10/2003 | Suzuki | |
| 2003/0231559 A1 | 12/2003 | Suzuki | |
| 2005/0249072 A1 * | 11/2005 | Hayashi | 369/47.11 |

FOREIGN PATENT DOCUMENTS

| | | |
|---|---|---|
| EP | 0-817-195 A2 | 1/1998 |
| EP | 1-204-106 A2 | 5/2002 |
| JP | 9-69264 | 3/1997 |
| JP | 9-259438 | 10/1997 |
| JP | 11-31357 | 2/1999 |
| JP | 2001-126255 | 5/2001 |
| WO | WO 03/038823 A1 | 5/2003 |
| WO | WO 03/105149 A1 | 12/2003 |

* cited by examiner

Primary Examiner—Muhammad Edun
(74) Attorney, Agent, or Firm—Dickstein Shapiro LLP

(57) ABSTRACT

An information recording method records information to a multilayer recording medium in which a number of record layers are laminated and recording of information to each record layer is possible. When an amount of the information being recorded to the medium does not exceed a maximum amount of information which can be recorded to the medium, the information being recorded to the medium is divided into data blocks by the number of the record layers. The data blocks are recorded to data areas of the respective record layers so that the recording areas of the record layers where the data blocks are recorded are overlapped each other with respect to a thickness direction of the medium.

20 Claims, 10 Drawing Sheets

FIG.3A
FIG.3B
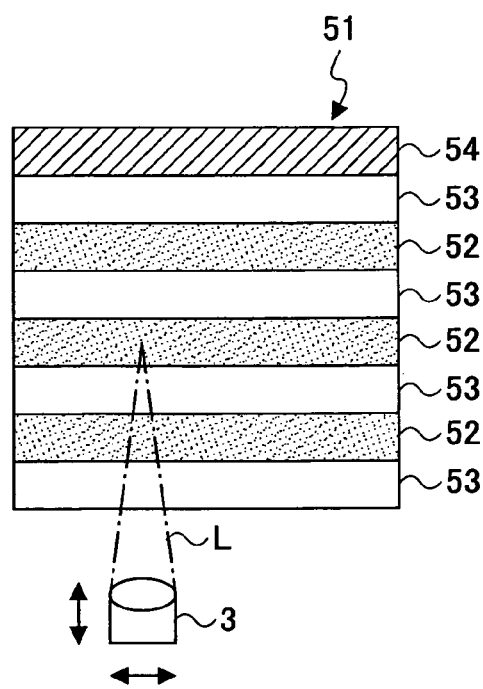
FIG.3C
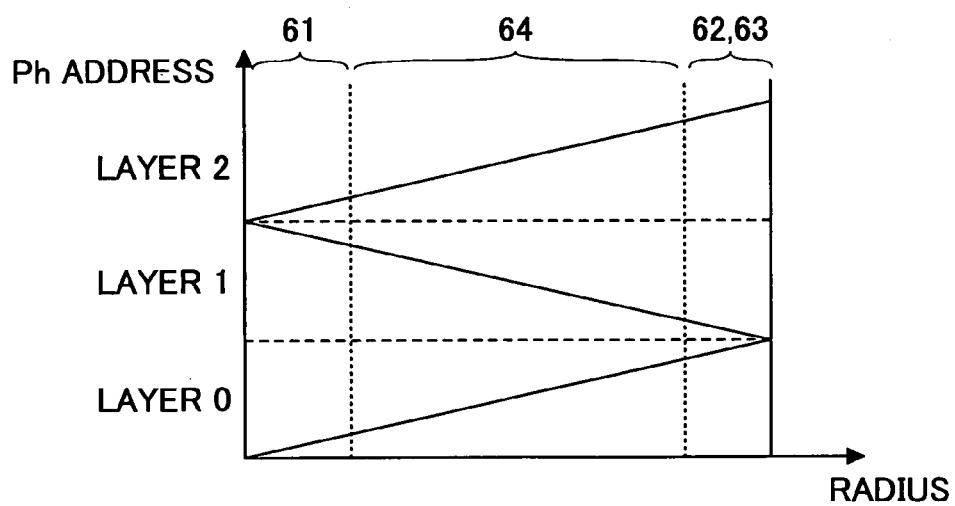

INFORMATION RECORDING METHOD, INFORMATION RECORDING DEVICE, INFORMATION SYSTEM, PROGRAM, AND RECORDING MEDIUM

BACKGROUND OF THE INVENTION

1. Field of the Invention

The present invention relates to an information recording method, an information recording device, etc. wherein information is recorded to a multilayer recording medium wherein a number of record layers are laminated and recording of information to each record layer is possible.

2. Description of the Related Art

Japanese Laid-Open Patent Application No. 2001-126255 discloses an information recording device in which recording of information to a write-once recording medium of two-layer structure is performed first from a back-side record layer of the two layers.

Japanese Laid-Open Patent Application No. 11-031357 discloses the technology of information recording in which a single file is divided into data blocks, and division recording of the data blocks is carried out in which the data blocks are individually recorded to a plurality of record layers, in order to prevent the duplication of the file data.

It is known that, in a DVD-ROM disk, the two or more record layers are laminated, and the data is recorded to each record layer. That is, it is specified that the optical disk (DVD5) has only the first layer, and the optical disk (DVD9) has the second layer as well. Moreover, the double-sided versions (DVD10, DVD18) of these optical disks are also known.

The DVD9 is not an optical disk which is completely different with the DVD5, but it is almost the same, and few problems arise with the reproduction of the data of DVD9.

Although the storage capacity of DVD9 is not equal to twice that of DVD5, this is because the recording density is lowered and the interaction with each record layer is inhibited.

Thus, the storage capacity of the optical disk with two or more record layers does not necessarily become the integral multiple of the recording amount of the optical disk only with the single record layer. Similarly, the recording method is also affected, and it cannot necessarily be performed in the same manner.

On the other hand, as rewritable DVD media, the DVD one side of which is provided with two or more record layers and the compatibility is taken into consideration, and the blue-ray disk (called "two-layer DVDR") are likely to be realized.

The storage capacity of the two-layer DVDR is 8.4 Gbytes which is about twice the storage capacity of the conventional one-layer DVD+R, which is 4.7 Gbytes. The recorded data can be read from the two-layer DVDR with the DVD player which is capable of reproducing the read-only DVD disk with the two layers of one side, or with the DVD-ROM drive.

When recording data to the two-layer DVDR, for a data area where data is recorded in one of the two record layers, data must be recorded also on the corresponding data area of the second layer. If there is the difference in the size of the data area of each record layer, the difference region needs to be recorded by dummy data or lead-out. This is to take the compatibility on the logic format with the read-only two-layer DVD.

Moreover, for example, when the user reproduces the data of the first layer, there is the case in which the data is not recorded on the second layer of the same radius position of the disk and the read head is placed to the second layer by chance during the seeking to the target address and the laser focusing is met there. In this case, the problem arises in that the data of the first layer cannot be reproduced with the read head. To avoid the problem, it is necessary that, when data is recorded in a data area of one of the two record layers, data be recorded also on the corresponding data area of the second layer.

Therefore, when the user data recording is completed without hardly recording the user data in the second layer at all or when the user data recording is completed with the second layer un-recorded, another problem will occur in that the processing to fill all the corresponding non-recorded data area of the second layer with the predetermined data must be performed before starting the data recording. It takes a long time to carry out the processing to fill them with the predetermined data.

Moreover, the logical address (LBA) in the two-layer DVDR is continuously assigned from the starting address of the data area of the first layer, and the logical address continues from the data area ending address of the first layer to the data area starting address of the second layer.

That is, when the user performs data recording continuously, it is started from the data area starting address of the first layer and completed at the data area ending address of the first layer, and it is performed in succession from the data area starting address of the second layer. Thus, the user is allowed to record the user data in the two-layer DVDR without being conscious of the two record layers.

For this reason, there is a conceivable case in which the user data recording is finished without completely recording the user data in all the data area of the second layer or with some of the data area of the second layer unrecorded. The above problem remains un-resolved.

In the case where the data recording is finished in the middle of the data area of the second layer, namely, the case where the user data recording is completed in the state where the non-recorded region exists in the data area of the second layer, the compatibility with the existing reproducing device is not retained. If the non-recorded region exists in the data area of the second layer the disk layout becomes different from that of the read-only two-layer DVD disk.

Moreover, in such a case, when the user reproduces the data of the first layer of the disk, the seeking to the target address may result in placement of the read head to the second layer and the focusing of laser light may be met there. There is the possibility that an error occurs due to impossibility of acquisition of the address information if the data is not recorded at the same radius position of the second layer. As a result, the problem may arise in that the data of the first layer cannot be reproduced.

The same problem arises also when the user data recording is finished without completely recording the second layer at all.

In order to prevent the above problem, the information recording device of Japanese Laid-Open Patent Application No. 2001-126255 functions to divide the recording data into two data blocks, and recording of the data blocks is performed to the two record layers, respectively. When this method is used, the above problem is avoided only in the case where the user data recording to the optical disk is intensively performed once. However, with this method, the additional data recording to the same medium is impossible.

Moreover, in the technology of Japanese Laid-Open Patent Application No. 11-031357, the prevention of the duplication of the file is the sole purpose, and the additional data recording is not taken into consideration.

SUMMARY OF THE INVENTION

An object of the present invention is to provide an improved information recording method and device in which the above-described problems are eliminated.

Another object of the present invention is to provide an information recording device which suppresses the variation in the characteristics of a multilayer recording medium such as the two-layer DVDR due to the presence of the non-recorded region, and provides excellent reproduction characteristics of the multilayer recording medium in the data recording.

Another object of the present invention is to provide an information recording method which suppresses the variation in the characteristics of a multilayer recording medium such as the two-layer DVDR due to the presence of the non-recorded region, and provides excellent reproduction characteristics of the multilayer recording medium in the data recording.

The above-mentioned objects of the present invention are achieved by an information recording method which records information to a multilayer recording medium in which a number of record layers are laminated and recording of information to each record layer is possible, comprising: dividing, when an amount of the information being recorded to the medium does not exceed a maximum amount of information which can be recorded to the medium, the information being recorded to the medium into data blocks by the number of the record layers; and recording the data blocks to data areas of the respective record layers so that the recording areas of the record layers where the data blocks are recorded are overlapped each other with respect to a thickness direction of the medium.

The above-mentioned objects of the present invention are achieved by an information recording device which records information to a multilayer recording medium in which a number of record layers are laminated and recording of information to each record layer is possible, wherein, when an amount of the information being recorded to the medium does not exceed a maximum amount of information which can be recorded to the medium, the information being recorded to the medium is divided into data blocks by the number of the record layers, the information recording device comprising: a first recording unit recording the data blocks to data areas of the respective record layers so that the recording areas of the record layers where the data blocks are recorded are overlapped each other with respect to a thickness direction of the medium.

The above-mentioned objects of the present invention are achieved by an information recording system in which an information recording device and a host computer connected to the information recording device are provided, the information recording device recording information to a multilayer recording medium in which a number of record layers are laminated and recording of information to each record layer is possible, the host computer comprising a first instruction unit deciding an amount of information being recording to the medium, and dividing, when the amount of the information does not exceed a maximum amount of information which can be recorded to the medium, the information being recorded to the medium into data blocks by the number of record layers, and the first instruction unit sending a request for recording the data blocks to the respective record layers of the medium to the information recording device, the information recording device comprising a first recording unit recording the data blocks to data areas of the respective record layers so that the recording areas of the record layers where the data blocks are recorded are overlapped each other with respect to a thickness direction of the medium.

The above-mentioned objects of the present invention are achieved by a computer program product embodied therein for causing a computer to execute an information recording method with an information recording system in which an information recording device and a host computer connected to the information recording device are provided, the information recording device recording information to a multilayer recording medium in which a number of record layers are laminated and recording of information to each record layer is possible, the information recording method comprising: deciding an amount of information being recording to the medium; dividing, when the amount of the information does not exceed a maximum amount of information which can be recorded to the medium, the information being recorded to the medium into data blocks by the number of record layers; sending a request for recording the data blocks to the respective record layers of the medium to the information recording device; and recording the data blocks to data areas of the respective record layers so that the recording areas of the record layers where the data blocks are recorded are overlapped each other with respect to a thickness direction of the medium.

According to the present invention, the information being recorded to the medium is divided into the data blocks by the number of the record layers, and the data blocks are recorded to the data areas of the respective record layers so that the recording areas of the record layers where the data blocks are recorded are overlapped each other with respect to the thickness direction of the medium. It is possible for the present invention to avoid the presence of non-recorded regions at the same radius position of the multilayer recording medium, thereby suppressing the variation in the characteristics of the medium due to the presence of the non-recorded region, and providing excellent reproduction characteristics of the medium in the data recording.

Moreover, according to the present invention, the locality of data on the medium is improved, thereby reducing the seeking movement of the optical pickup of the information recording device, which contributes the improvement in the performance of information recording and reproduction.

BRIEF DESCRIPTION OF THE DRAWINGS

Other objects, features and advantages of the present invention will be apparent from the following detailed description when reading in conjunction with the accompanying drawings.

FIG. 3A, FIG. 3B and FIG. 3C are diagrams showing the composition of a multilayer optical disk which is placed in the optical disk drive.

DETAILED DESCRIPTION OF PREFERRED EMBODIMENTS

A description will now be given of the preferred embodiments of the invention with reference to the accompanying drawings.

Figure 1:
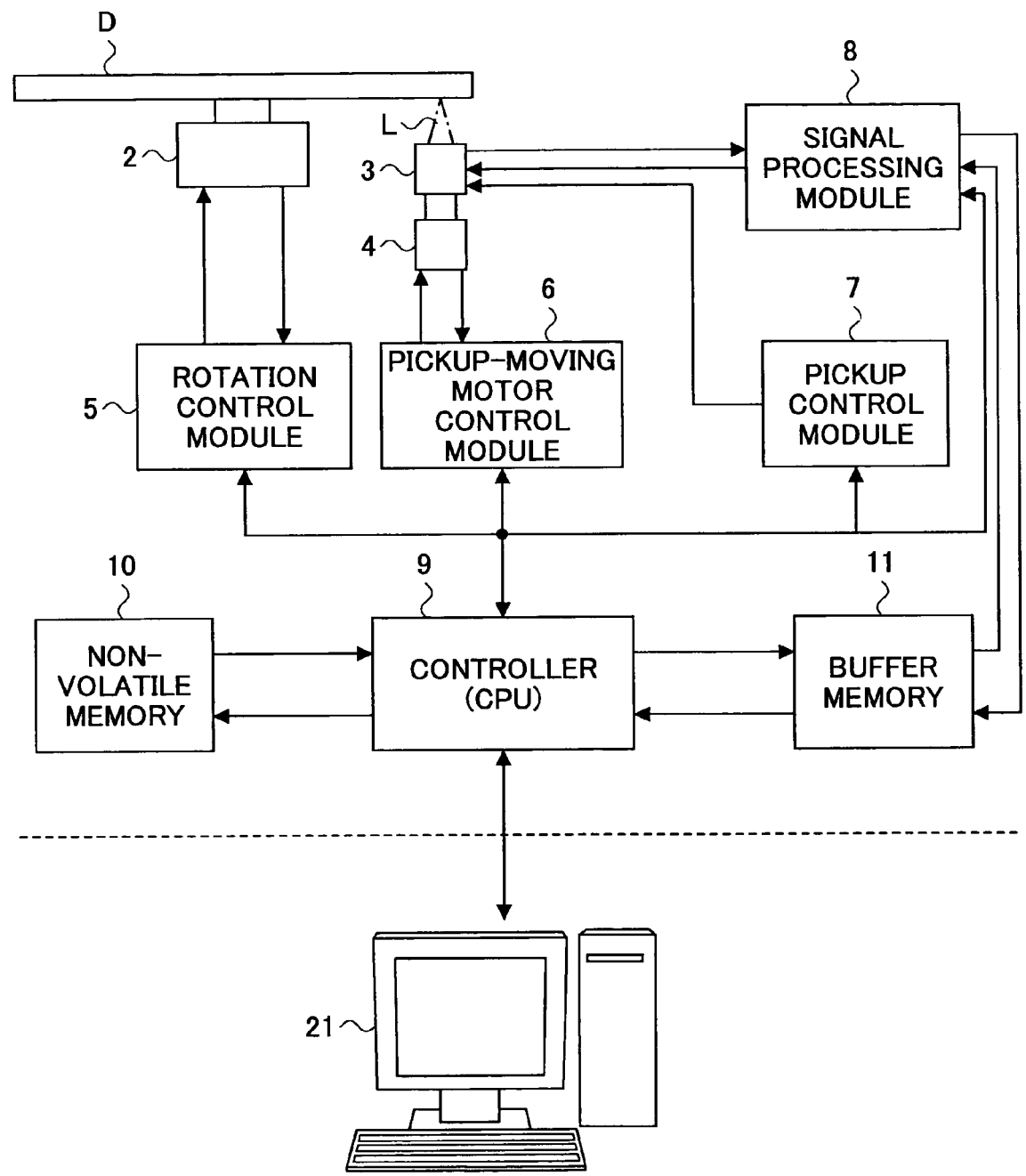
FIG. 1 is a block diagram showing the composition of the optical disk drive in which the information recording method of the invention is embodied.

FIG. 1 shows the outline composition of the optical disk drive 1 in which the information recording device of the invention is embodied.

In the optical disk drive 1, the optical disk D in which a plurality of record layers are laminated (called the "multilayer disk") is placed, and recording and reproduction of user information desired by the user to and from each record layer of the optical disk D is possible with the optical disk drive 1.

As shown in FIG. 1, the optical disk drive 1 comprises the spindle motor 2 which rotates the optical disk D, the optical pickup 3 which irradiates the laser light L to the optical disk D in order to perform the information recording and reproduction, and the pickup-moving motor 4 which moves the optical pickup 3 in the radius direction of the optical disk D.

When the optical disk D is the multilayer disk, the optical pickup 3 is capable of focusing the laser light to the optical spot at each of the record layers, and thereby it is capable of accessing each record layer of the optical disk D.

The spindle motor 2 is controlled by the rotation control module 5, the pickup-moving motor 4 is controlled by the pickup-moving motor control module 6, and the optical pickup 3 is controlled by the pickup control module 7.

The signal processing module 8 performs a predetermined signal processing of either the data signal read from the optical disk D by the optical pickup 3 or the data signal being recorded to the optical disk D by the optical pickup 3.

The controller 9 is provided with CPU and controls the respective parts of the optical disk drive intensively. This controller 9 includes the high-speed memory including the registers etc. with a small storage capacity, and performs at high speed the buffer memory operation and digital signal processing which are the fixed digital processing.

The data read from the optical disk D is stored in the buffer memory 11, and transmitted to the host computer 21 through the controller 9 and the interface 12.

When recording the information in the optical disk D, the data transmitted from the host computer 21 is stored in the buffer memory 11 through the interface 12 and the controller 9, and it is recorded in the optical disk D through the laser light from the optical pickup 3 and the signal processing module 8.

The non-volatile memory 10 holds various kinds of the device setup information even if the power supply is off, and holds the data which must be retained for a long term period, including various control programs, various control parameters to various optical disks, etc.

Based on the control program stored in the non-volatile memory 10, the controller 9 performs the processing performed by the optical disk drive 1 (which will be described later).

The optical disk drive 1 communicates with the host computer 21 through the predetermined external interface. This interface may include ATA/ATAPI, SCSI, USB, IEEE1394, IEEE802, Serial ATA, etc. which can be used for the personal computers.

Communication between the optical disk drive 1 and the host computer 21 is carried out by issuing the instruction data stream (command) from the host computer 21 to the optical disk drive 1, and the response to the command is sent from the optical disk drive 1 to the host computer 1.

By using the command, the recording operation mode can be changed to the reproducing operation mode, or the record layer (in the case of the multilayer disk), the location and the size, which is actually reproduced or recorded, etc. can be instructed.

Generally, the specification of the recording location may be expressed by the logical address LBA as a single-dimension-address space for any type of the optical disk. The logical address is the address system used for specifying the recording position of the information by the optical disk drive 1 and the host computer side while the physical address is predetermined in the optical disk D.

The focusing operation of the optical pickup 3 is required when operating it to the different record layers, and even if it is the linear address specification, the change timing of the record layer is explicit.

Figure 2:
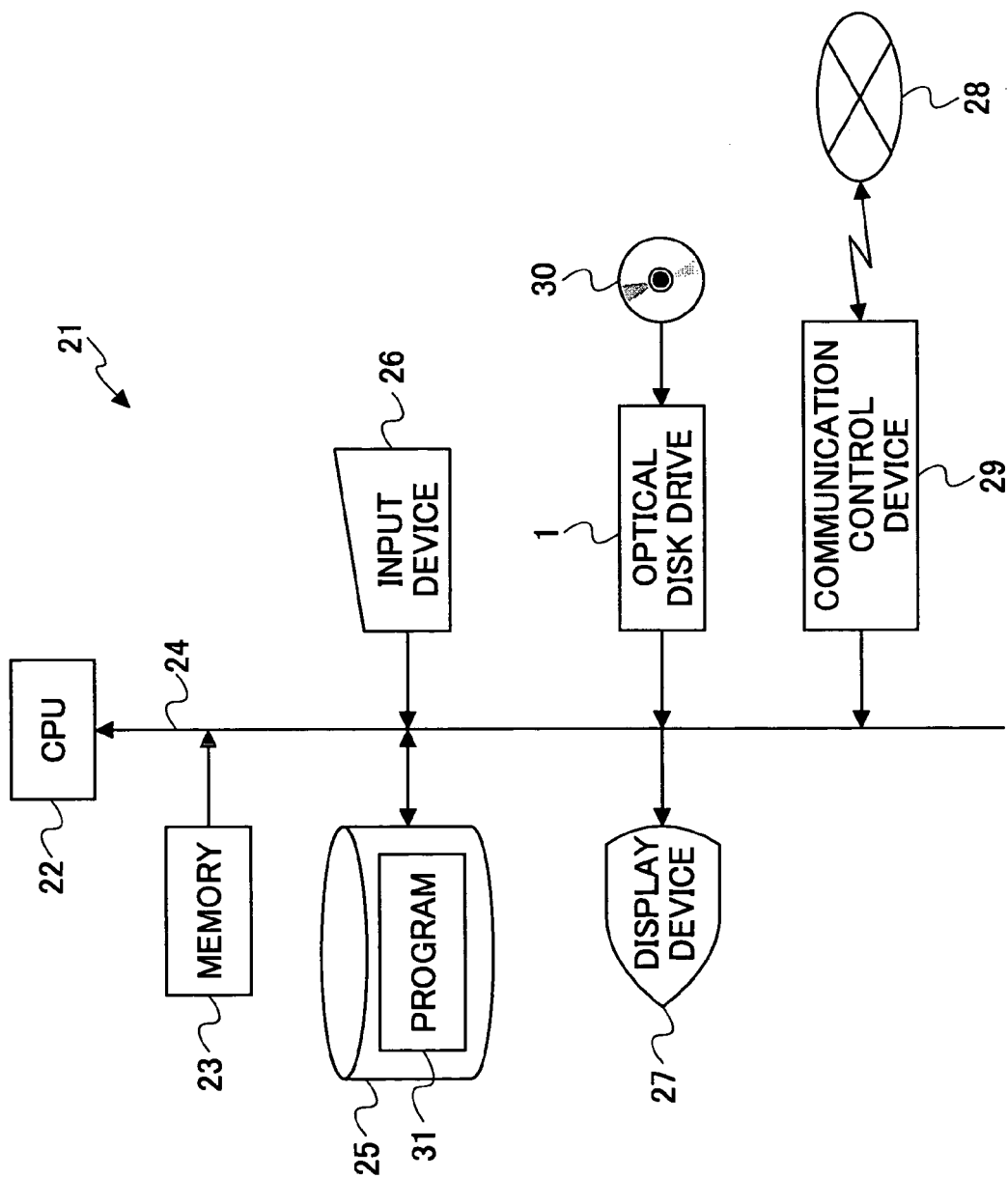
FIG. 2 is a block diagram showing the electrical connection of the host computer in which the optical disk drive of FIG. 1 is provided.

FIG. 2 is a block diagram showing the electric connection of the host computer 21.

As shown in FIG. 2, the host computer 21 is a computer, such as PC (personal computer). In the host computer 21, the CPU 22 which performs various operations and controls respective parts of the host computer 21 intensively, and the memory 23 which includes various kinds of ROMs and RAMs are interconnected by the bus 24.

Moreover, connected to the bus 24 through the predetermined interfaces are the magnetic storage 25, such as the hard disk drive, the input devices 26, such as the keyboard and the mouse, the display device 27, the optical disk drive 1, and the communication control device 29 which communicates with the network 28.

The recording medium 30 may be any of various media, including the optical disks, such as CD, DVD, the magneto-optic disk, and the flexible disk, which can be read using the optical disk drive 1 and other drive devices.

The information recording system of the present invention can be carried out with the host computer 21 provided with the optical disk drive 1.

The host computer 21 reads the control program 31 in which the information recording program of the invention is embodied, from the recording medium 30 in which the recording medium of the invention is embodied, and installs it in the magnetic storage 25.

These programs may be downloaded through the network 28, such as the Internet, and installed in the magnetic storage 25. By this installation, the host computer 21 is set in the state which can perform the predetermined processing. In addition, the control program 31 may be operated on the predetermined OS.

FIG. 3A through FIG. 3C are diagrams showing the fundamental composition of the multilayer disk 51 which is the multilayer recording medium in which information is recorded and reproduced by the optical disk drive 1.

As shown in FIG. 3A and FIG. 3B, the multilayer disk 51 is the disk-like plate in which two or more record layers 52 are laminated, and the protection layers 53 are formed between the information recording/reproducing surfaces and the record layers 52. In this embodiment, as shown in FIG. 3B, the optical disk in which information can be recorded only on one surface of the disk is used, and the cover layer 54 is formed on the other surface of the disk opposite to the recording/reproducing surface.

Although the record layer 52 may be the write-once type or the rewritable type, in order to carry the recording function, it may be further divided into two or more fine record layers from which the physical characteristic differs.

In order to put the optical spot of the laser in such a multilayer disk 51 to the record layer 52 in the position distant from the optical pickup 3, the record layer 52 of the near position will be passed from the recording head.

With the passing of the optical spot in the record layer 52, it is not necessarily guaranteed that it is recorded or not recorded. For this reason, the signal quality is not fixed and easily varied for both the cases of record and reproduction.

Thus, in the multilayer disk 51 with the number of record layers 52, the recording characteristics and reproducing characteristics for every record layer 52 are varied in many cases.

FIG. 3C shows the relation between the radius position of the multilayer disk 51 and the physical address.

The physical address is continuously assigned within the single record layer 52 (layers 0-2 indicate the record layer 52, respectively). There are also various methods of assigning the physical addresses.

Between the record layers 52, the address continues only in the innermost or the outermost circumference. At this time, the composition in which the address continues on the outer circumference (the even-numbered record layer 52 advances toward the inner circumference from the outer circumference) is called OTP (opposite track path).

On the other hand, the composition in which the address of each record layer 52 increases uniformly from the inner circumference to the outer circumference is called PTP (parallel track path).

In OTP, even if the address reaches the outermost circumference, the continuous reproduction of the information is possible without performing the seeking operation.

As shown in FIG. 3C, in the respective record layers 52 of layers 0-2, the lead-in (LI) groove 61 is recorded at the beginning of the record layer 52 (layer0) which is recorded first.

The middle area (MA) 62 is recorded at the last of each of the record layers 52 (layer0 and layer1). Exceptionally, the lead-out (LO) 63 is recorded at the last of the last record layer 52 (layer2).

And the intermediate area between the lead-in groove 61 and the middle area 62 (or the lead-out 63) is the data area 64 in which the user data is recorded.

Next, the information recording method performed by the optical disk drive 1 for the multilayer disk 51 will be explained.

In the present embodiment, the multilayer disk 51 having the two-layer structure with the two record layers 52 will be explained as an example.

Figure 4A:
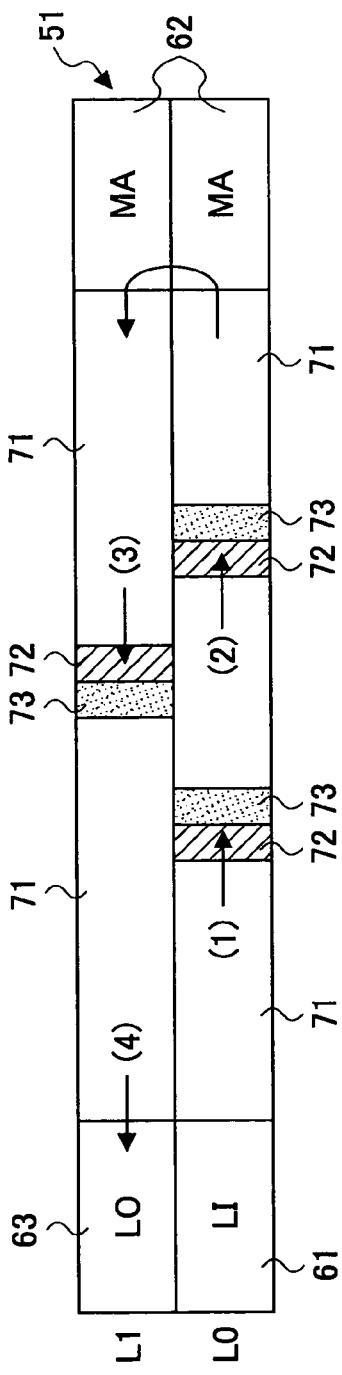
FIG. 4A, FIG. 4B and FIG. 4C are diagrams for explaining the conventional method of recording of the multilayer optical disk, and the information recording method of the invention.
Figure 4B:
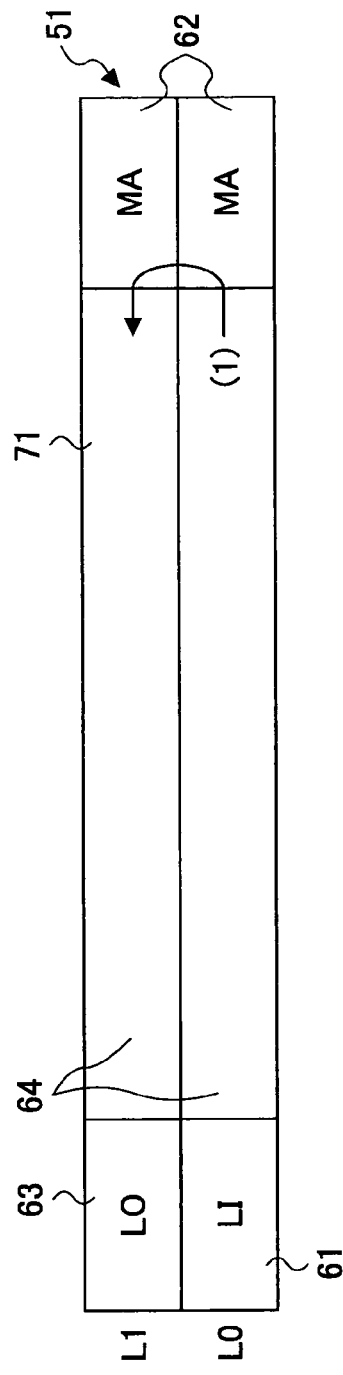

As shown in FIG. 4A and FIG. 4B, as the general recording method for the multilayer disk 51, there are two methods (a) and (b). In the method (a), the OTP recording is performed in order of layer0 (L0) and layer1 (L1), and the additional recording is performed similar to the optical disk D of the single layer. In the method (b), the recording is performed consecutively to all the record layers 52.

In the recording method of FIG. 4A, the first recording (1) is performed so that the lead-in groove 61, the user data 71, and the closure 72 are recorded. The second and subsequent recordings (2) and (3) are performed so that the intro 73, the user data 71, and the closure 72 are recorded, and the middle area 62 is recorded at each of the tail end of layer0 and the head end of layer1, respectively. And the last recording (4) is performed so that the lead-out 63 is recorded at the tail end of layer1 in the last recording (4).

In the recording method of FIG. 4B, the recording is performed consecutively to all the record layers 52 (layer0 and layer 1), and neither the intro 73 nor the closure 72 is recorded in the data area 64.

Figure 4C:
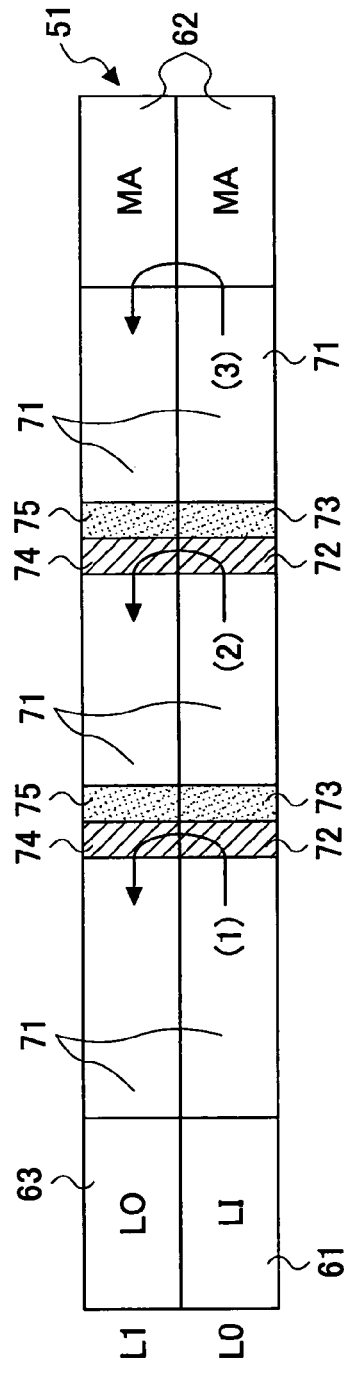

FIG. 4C is a diagram for explaining the information recording method of the preferred embodiment of the invention for the multilayer disk 51, which is performed by the optical disk drive 1.

In the information recording method of FIG. 4C, the recording is performed when the amount of the information being recorded to the multilayer disk 51 does not exceed the storage capacity of all the record layers 52 of the multilayer disk 51. In other words, the non-recorded regions remain in any of the record layers 52 of the multilayer disk 51 at the end of the recording of all the data to be recorded to the medium, and the regions other than the data-recorded areas of the medium are set in the recording-end state before the recording of all the data is finished.

When the recording of the data in the same amount of information as the storage capacity of all the record layers 52 of the multilayer disk 51 is performed, the same recording method as the above-described case of FIG. 4B can be used.

According to the information recording method of the preferred embodiment, when recording the data to the multilayer disk 51, the data being recorded to the disk is divided into data blocks by the number of the record layers 52 (in the example of FIG. 4C, the number of record layers is equal to 2). The data blocks are sequentially recorded to the respective record layers 52 of the multiplayer disk 51 so that the recording areas of the record layers 52 where the data blocks are recorded are overlapped each other with respect to the thickness direction of the multiplayer disk 51.

In this case, the recording is performed so that most of the recording areas of the record layers 52 where the data blocks are recorded have no regions which are not overlapped each other with respect to the thickness direction of the multilayer disk 51. Practically, however, due to the relation of the minimum recording unit of the multilayer disk 51, the regions which are not overlapped may partially remain in the recording areas of the record layers 52 where the data blocks are recorded.

When the recording accompanied by the interruption (session closing) of the recording is performed with the additional recording being permitted layer, the information recording method as shown in FIG. 4C is performed.

Specifically, as shown in FIG. 4C, when the first recording (1) is performed, the lead-in groove 61 which indicates the start of recording of the multilayer disk 51 and the start of recording of the first layer, the user data 71, and the closure 72 which indicates the end of recording of the first layer (which closure 72 also becomes the information which indicates the interruption (session closing) of recording with the additional recording being permitted later) are recorded from the head end of layer0 (the first layer). After this, for the area of the second layer (layer1) overlapping just above the area of the first layer (layer0) where the above recording is performed, the data (which corresponds to the intro 73 and will be called the start area 74 in the present specification) which indicates the start of recording of the second layer, the user data 71, and the lead-out 63 which indicates the end of recording of the second layer (which lead-out 63 also becomes the information which indicates the end of recording of the multilayer disk 51; this information being recorded in this stage) are recorded.

When the second recording (2) accompanied by the interruption is performed next, the lead-in groove 61 which indicates the start of recording of the first layer, the user data 71, and the closure 72 which indicates the end of recording of the first layer are recorded immediately after the closure 72 in the previous recording of the first layer (layer0). After this, for the area of the second layer (layer1) overlapping just above the area of the first layer (layer0) where the above recording is performed, the start area 74 which indicates the start of recording of the second layer, the user data 71, and the data which indicates the end of recording of the second layer (which data corresponds to the closure 72 and will be called the end area 75 in the present specification) are recorded.

And when the recording is finished (disk closing) to inhibit the additional recording from being performed later (in the example of FIG. 4C, the third recording (3)), the lead-in groove 61 which indicates the start of recording of the first layer (layer0), the user data 71, and the middle area 62 which indicates the end of recording of the first layer (which middle area 62 also becomes the information which indicates the completion (disk closing) of the recording with the additional recording being inhibited) are recorded. After this, for the area of the second layer (layer1) overlapping just above the area of the first layer (layer0) where the above recording is performed, the middle area 62 which indicates the start of recording of the second layer, the user data 71, and the end area 75 which indicates the end of recording of the second layer are recorded.

The above-described information recording method does not record one of the record layers 52 consecutively for all the areas. In the above-described information recording method of FIG. 4C, the data recording is performed consecutively from the inner circumference side of the multilayer disk 51 one by one, and such data recording is repeatedly performed for all of the two or more record layers 52.

According to the above-described information recording method, when the data recording is interrupted temporarily (session closing), the closure 72 or the end area 75 (or the lead-in groove 63) is recorded to all the record layers 52, which indicates explicitly that the interruption of the data recording is performed there.

Moreover, according to the above-described information recording method, when the data recording is finished (disk closing), the middle area 62 is recorded to all the record layers 52 in the same manner, which will inhibit the data recording from being further performed later.

Figure 6A:
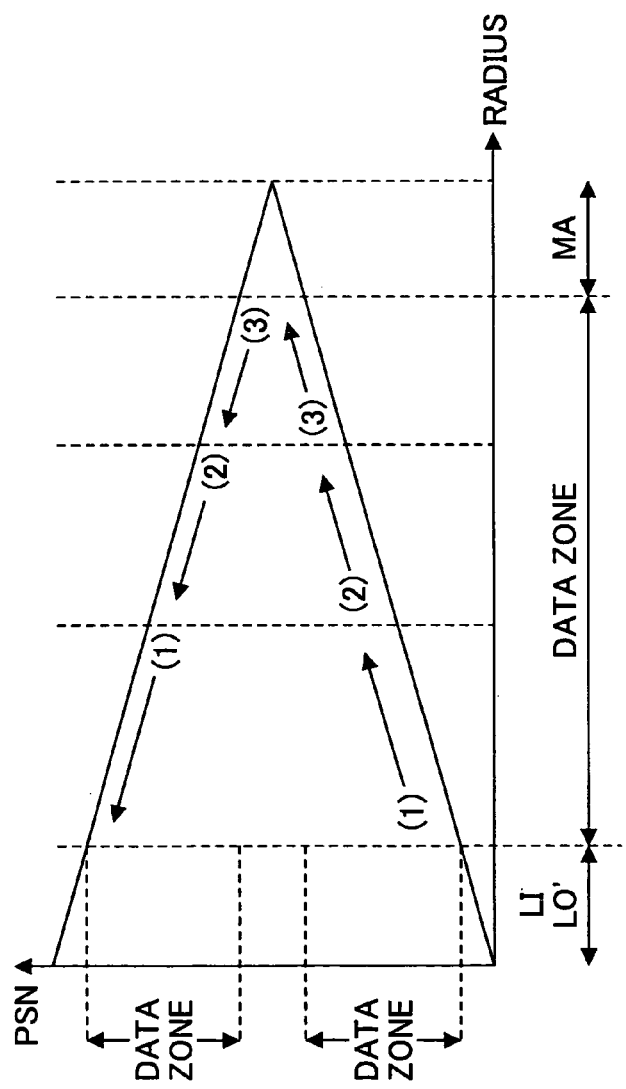
FIG. 6A and FIG. 6B are diagrams for explaining the relation between the radius position of the multilayer optical disk and the physical address, and the relation between the radius position of the multilayer optical disk and the logical address.

FIG. 6A shows the relation between the radius position (radius) of the multilayer disk 51 and the physical address (PSN) in the case of performing the above-mentioned information recording method.

The physical address increases from the inner circumference side of the multilayer disk 51 to the outer circumference side at a fixed rate, and the data recording to the second record layer 52 overlapping just above the first recording layer 52 is restricted, so that the data recording is uniformly performed to all the record layers 52.

In the above case, if the outermost circumference position in the first record layer 52 is not decided, then a deviation in the logical address will arise in the second or subsequent record layer 52. However, if the middle area 62 is immediately recorded in order to prevent this problem, then the middle area 62 will be moved to the inner circumference side and the storage capacity that can be recorded in the multilayer disk 51 will be decreased. Conversely, if the middle area 62 is not recorded immediately, then the premise of the logical address where the first layer is followed by the second layer continuously will not be attained.

According to the above-described information recording method, the total amount of the data being recorded to the optical disk once is known at the start of the data recording, and the data of the total amount is divided into the data blocks by the number of the record layers 52. Then the amount of the data for one record layer 52 is calculated. The last address of the first record layer is specified beforehand, and the data recording to the subsequent addresses after the last address of the first recording layer is inhibited. Hence, the subsequent address of the second layer can be automatically decided. Therefore, even if the data recording to the two or more record layers 52 is performed, the logical address can be properly assigned without causing a deviation in the logical address.

Figure 6B:
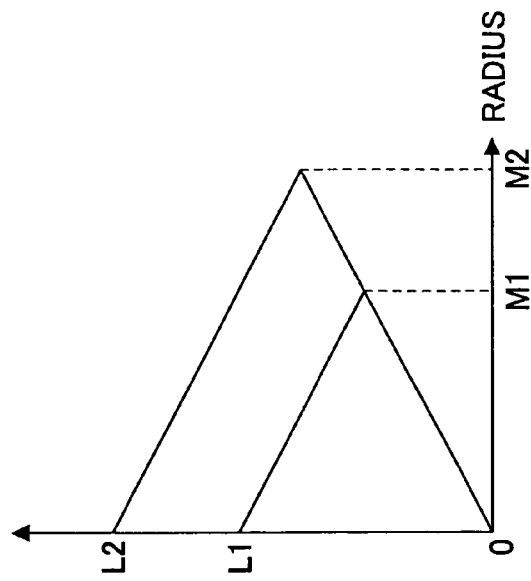

As shown in FIG. 6B, suppose that the total amount of the data being recorded to the optical disk once is known and the radius position of the last record position of the first record layer 52 is M1. In such a case, the proper physical address up to L1 is assigned. Suppose that the total amount of records of the data being recorded to the optical disk by the next recording is known and the radius position of the last record position of the first record layer 52 is M2. In such a case, the proper physical address up to L2 is assigned.

Moreover, the data recording to each of the record layers 52 is not necessarily distributed equally to each record layer 52. When the regions of the respective record layers 52 where the data recording is performed are not overlapped completely with respect to the thickness direction of the multilayer disk 51, the padding is performed using the predetermined value (for example, zero) so that the predetermined data is compensated for the non-match region. Thereby, the data recording is carried out so that the regions of the respective record layers 52 where the data recording is performed are overlapped completely. Moreover, it can also be guarantees that a series of the data recording operations is always performed starting from the first record layer 52.

Figure 5:
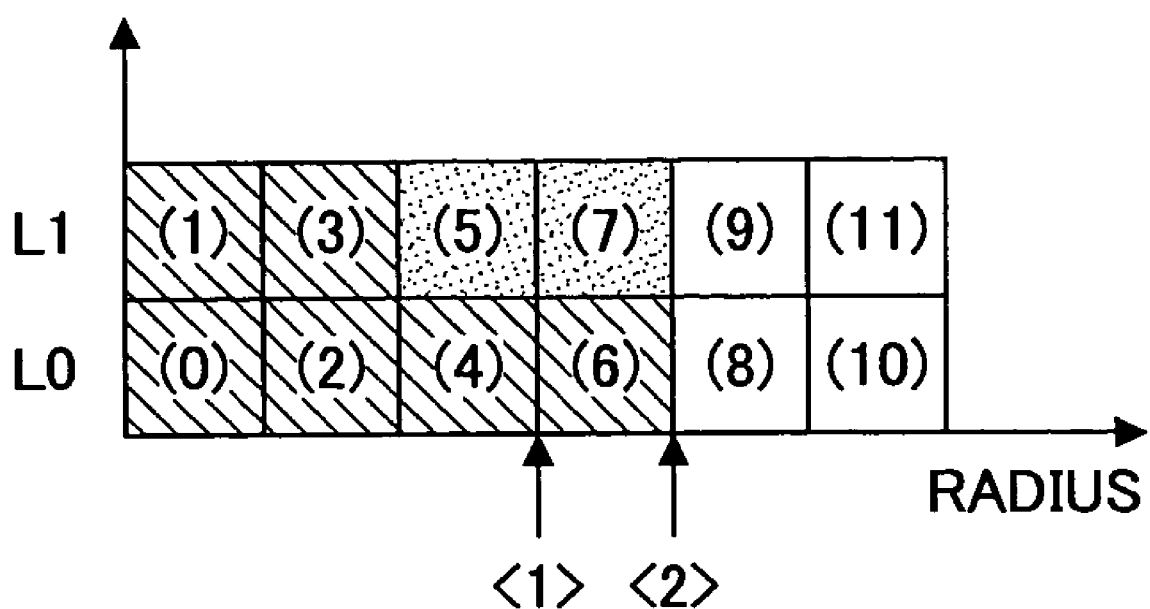
FIG. 5 is a diagram for explaining the processing of padding.

FIG. 5 is a diagram for explaining the processing of padding. In the example of FIG. 5, it is supposed that the two files (files 1 and 2) are recorded by the first recording operation (they are recorded up to the position of <1>). The file 1 corresponds to the blocks of (0)-(2), the file 2 corresponds to the blocks of (3)-(4), and the block of (5) is compensated for by the padding. The second recording operation is performed up to the position of <2>, and only the file 3, corresponding to the block of (6), is recorded. The block of (7) is compensated for by the padding.

Next, the processing which is performed by the optical disk drive 1 to carry out the above-described information recording method with reference to FIG. 4C through FIG. 6B will be explained.

Figure 7:
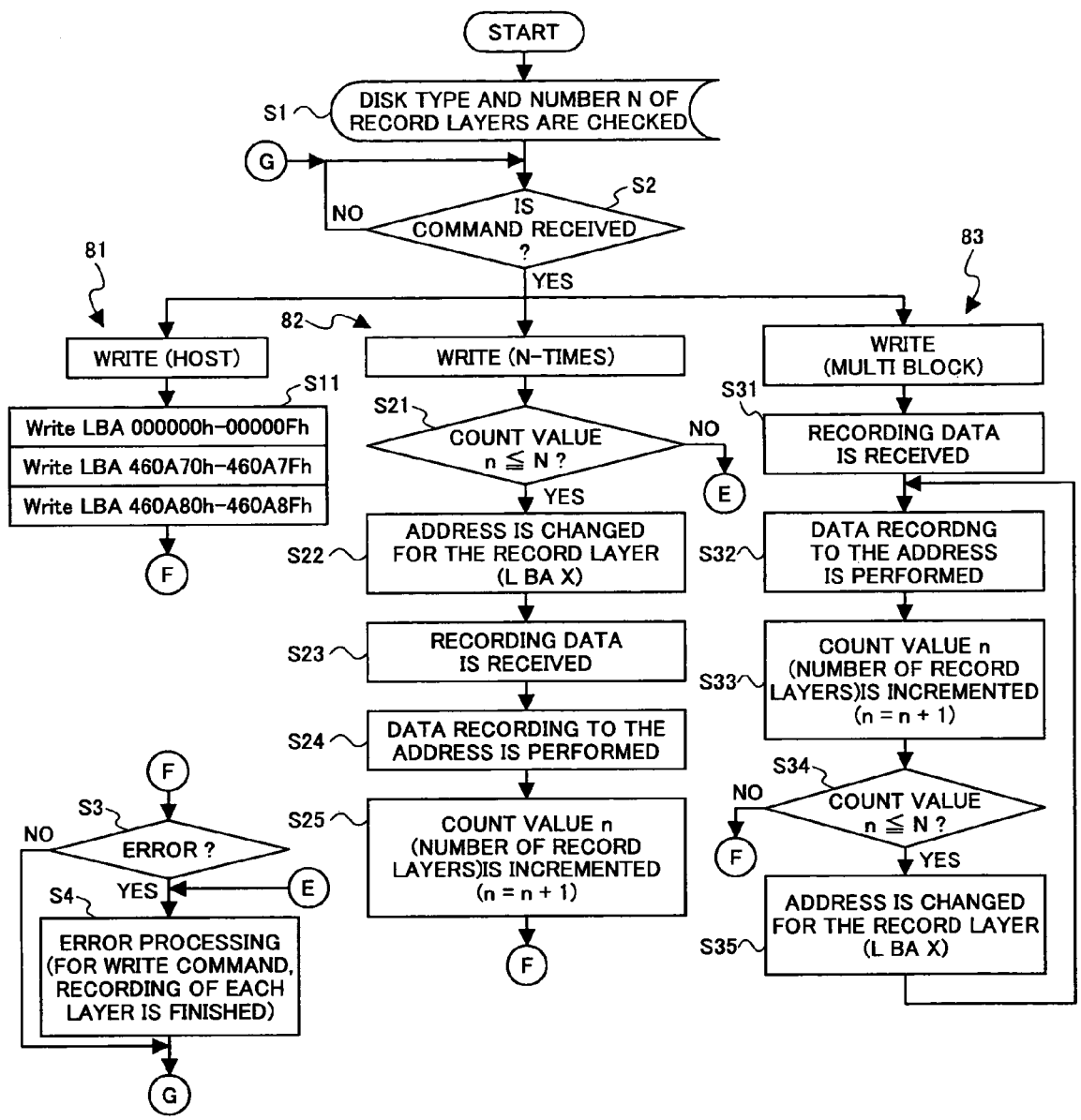
FIG. 7 is a flowchart for explaining the processing performed by the optical disk drive of the preferred embodiment of the invention.

FIG. 7 is a flowchart for explaining the processing which is performed by the optical disk drive 1. The first recording unit in the claims is realized by the processing of FIG. 7.

As shown in FIG. 7, the write command (WRITE) is used to supply the instructions for the data recording to the optical disk drive 1, and there are some methods for this purpose. In the processing of FIG. 7, there are provided the three procedures 81, 82 and 83.

The common processing for the three procedures is the steps S1 and S2. The processing of FIG. 7 is started when the multilayer disk 51 is loaded into the optical disk drive 1. The controller 9 checks the kind of the multilayer disk 51, and the number N of the record layers 52 (step S1). The controller 9 sets the optical disk drive 1 in the state of awaiting receiving of a command from the host computer 21 (step S2).

If the command is received, the control is branched to one of the three procedures according to the received command and the processing is completed. Then, the control is returned back to the waiting loop for the command from the host computer 21 (step S2) again.

The first procedure is the processing which is performed when the Write (HOST) command is received (the procedure 81).

In this case, at the host computer 21 side, the logical-address range which corresponds to the number of the record layers 52 is determined, and the write command is issued respectively. In this method, the data recording is performed by the optical disk drive 1 except the error checking, and the data is recorded only to the specified addresses (step S11).

For example, the logical addresses where the data recording is performed in the multilayer disk 51 of the three record layers 52, when the number of recording sectors of the single record layer is 230540h in the OTP recording and the first 16 sectors of the disk are recorded are as indicated in the step S11 of FIG. 7. Namely, by performing the above-mentioned information recording method from the head end or tail end of each record layer 52, the first 16 sectors of the first record layer 52, the last 16 sectors of the second record layer 52, the first 16 sectors of the third record layer 52, etc. are recorded in this order.

Figure 8:
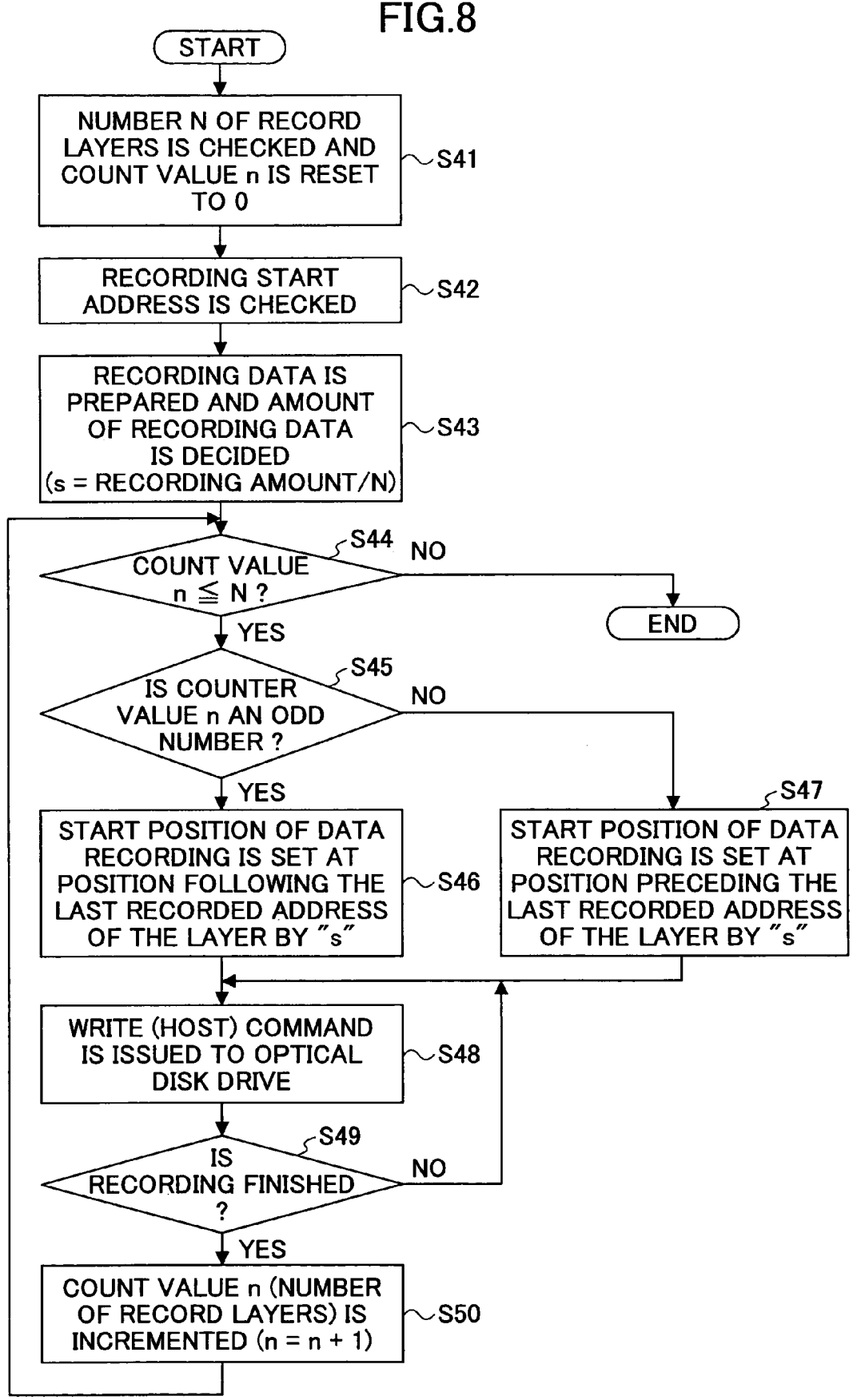
FIG. 8 is a flowchart for explaining the processing performed by the host computer.

FIG. 8 is a flowchart for explaining the processing which is performed by the host computer 21 when the data recording procedure 81 is taken.

Based on the program 31 according to the program of the present invention, the CPU 22 performs the processing of FIG. 8. The first instruction unit in the claims is realized by the processing of FIG. 8.

First, the CPU 22 looks into the state of the multilayer disk 51, checks the number N of the record layers 52, and resets the count value n of a predetermined counter to 0 (step S41).

Next, the CPU 22 checks the last address of each record layer 52 where the data recording is previously completed (thereby, the address where the starting of the data recording is possible is checked) (step S42).

The direction of the data recording in the even-numbered record layer 52 is reverse to the direction of the data recording in the odd-numbered record layer 52, and the address immediately before the position where the data recording is previously completed is checked at this step.

Next, the CPU 22 prepares the data which is to be recorded, and decides the total amount of the recording data (step S43). The amount of the recording data equally divided for each record layer 52 (which is referred to as "s") is calculated from the decided total amount of the recording data and the number of record layers 52. In the present embodiment, this recording amount "s" is calculated by dividing the total amount of the recording data by the number of the record layers 52 (step S43).

The data recording is performed sequentially from the first record layer 52. In the odd-numbered record layer 52, the start position of the data recording follows from the last address where the previous data recording is completed by the number s, and in the even-numbered record layer 52, the start position of the data recording precedes from the last address where the previous data recording is completed by the number s, respectively (steps S45-S47).

Next, the CPU 22 issues the Write (HOST) command to the optical disk drive 1 (step S48), and waits for the end of the data recording by the optical disk drive 1 (step S49). Thereby, the above-mentioned processing (procedure 81) is performed by the optical disk drive 1 when the Write (HOST) command is received.

When the data recording by the optical disk drive 1 is completed (or when the result at the step S49 is affirmative), the CPU 22 increments the count value n of the predetermined counter (step S48).

When the count value n is below the number N (or when the result at the step S44 is affirmative), the above processing of the steps S45-S50 is repeated for the following record layer 52.

When the count value n reaches the number N and the data recording is completed in all the record layers 52 (or when the result at the step S44 is negative), the processing of FIG. 8 is finished.

Referring back to FIG. 7, the second procedure is the processing which is performed when the Write (N-TIMES) command is received (procedure 82).

In this case, at the host computer 21 side, the same Write (N-TIMES) command is issued in succession by the number of the record layers 52.

For the first time, the command reception is performed after the predetermined count value n is reset to 0.

Next, when the count value n is below the number N of record layers (or when the result at the step S21 is affirmative) the data recording can be performed if the command is received within the number N of record layers, the address in the command is changed to the applicable address in the record layer 52 (step S22). However, the address in the command remains unchanged for the first time.

Next, the recording data is received from the host computer 21 (step S23), and the data is actually recorded to the optical disk (step S24).

Next, the count value n is incremented (step S25), and the optical disk drive 1 waits for reception of the following command.

The third procedure is the processing which is performed when the Write (MULTI BLOCK) command is received (procedure 83). In this case, at the host computer 21 side, the write command is issued once in the range of the single record layer 52, and the recording data is transmitted by the data transfer for the amount of the recording data for all the record layers 52.

That is, the data in the amount corresponding to the number of sectors specified by the command multiplied by the number of record layers will be recorded.

First, the command is received and all the recording data is received (step S31).

The recording of the received data to the applicable address of the optical disk is performed from the starting position (step S32).

When the data recording is completed, the count value n is incremented (step S33), and the record layer 52 is changed to the next one.

When the count value n is below the number N of record layers (or when the result at the step S34 is affirmative), the address is changed to the address in the applicable record layer 52 (step S35), and the control is returned to the step S32, and the data recording in the range is performed again.

The above-mentioned processing is repeated for the number of record layers 52.

Different from the second procedure is that the issuing of the write command in the host computer 21 can be managed only once in the third procedure. This procedure is characterized in that the optical disk drive 1 is controlled to operate so that it may record the user data to all the record layers 52 per one recording unit.

In any of the procedures 81 to 83, it is detected whether a predetermined write error occurs in the middle of the data recording (step S3). When the write error occurs, a predetermined error processing is performed (step S4).

In the error processing of step S4, it is in the middle of record of the data, and after making each record layer 52 record end by the predetermined data altogether even if it is the middle when it becomes the error, it is good to make it make record operation complete.

That is, if it is not someday made to record end even if it is going to read the part until it becomes the error, reproduction is difficult, and the probability which becomes the error again immediately after the error occurs is high.

Furthermore, when the radius position in the multilayer disk 51 of the recordable newest or the forefront address becomes various, it is because address computation also becomes complicated.

Although the record procedure becomes complicated in order for each of each processings of the procedures 81-83 to have merits and demerits and to manage all by the host computer 21 side in the first processing, there is the advantage made like the optical disk only for the logical address reproduction.

Since it cannot distinguish if the command with the intention of rewriting of the data continues when it is the second processing and is the rewritable the optical disk, a certain distinction flag or the record layer 52 needs to be specified.

Although the second and the third processing can do the logical address to specify simply similarly to the optical disk of the single record layer, if they are not the record formats to which structure is fixed to some extent in order to record also on the different place from the logical-address range specified by the record command, they will tend to cause the confusion.

Since there is the role which usually records the file system in the host computer 21 side, it is thought that the first processing is suitable for it being necessary to perform logical-address (LBA) calculation, and using general-purpose.

Figure 9:
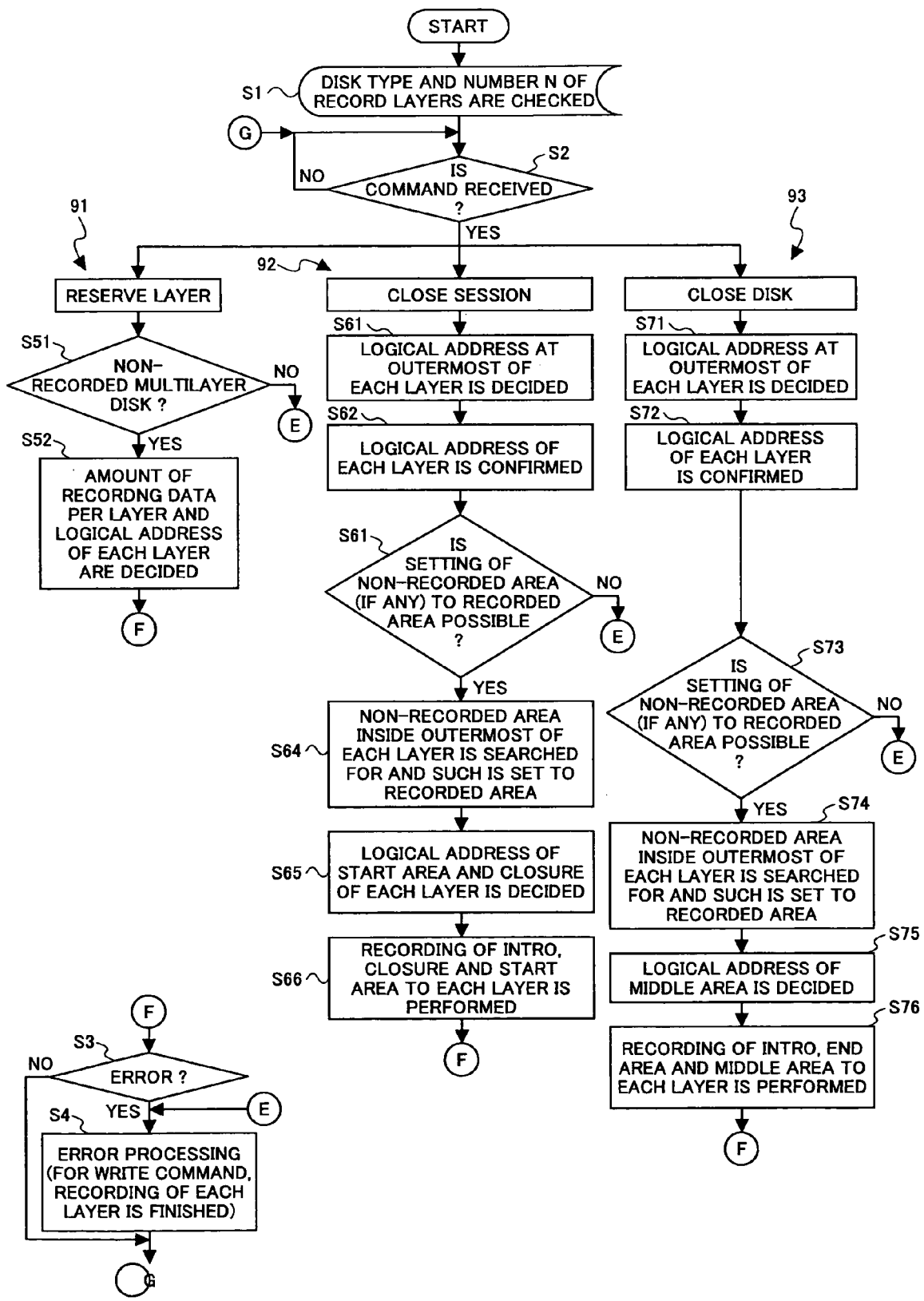
FIG. 9 is a flowchart for explaining the processing performed by the optical disk drive of the preferred embodiment of the invention.

With reference to FIG. 9, the processing (procedure 91) which sets up beforehand the total amount of records to the multilayer disk 51 is explained.

The processing of steps S1-S4 is the same as in the processing of FIG. 7, and a description thereof will be omitted.

This command is temporarily set to the reserve layer.

If this command is received from the host computer 21, the optical disk drive 1 will check that it is the non-recorded multilayer disk 51 (step S51), will determine the amount of the recording data per layer from the total amount of records of the data specified by the command, and the record number of layers N, will determine the logical-address range of each record layer 52, and will record it on the lead in groove 61 of the multilayer disk 51 etc. (step S52).

That is, if addressing on condition of the multilayer disk 51 increasing in single dimension within the record layer 52 if the data is divided and recorded on each record layer 52 is used and record of the record layer 52 of the first layer will not be completed, there is fault which the address after the second layer does not decide.

Here, since the last address of the eye is specified further beforehand at least (the logical-address range of each record layer 52 is determined at step S52) and it is recorded on the lead in groove 61 etc. (step S52), the address of the record layer 52 after the second layer can be automatically decided by forbidding record to the address after it.

The address which does not have conflict by this though written in two or more record layers 52 can be assigned.

If the amount of the maximum records which the multilayer disk 51 has automatically is set up by the case where this command is not applied except when substituting record for once altogether (disk at once), it will be turned out that the user friendliness becomes good.

After the end of data recording by processing of FIG. 7, in case the procedure 92 performs the interruption (session closing) of the record to the multilayer disk 51, it is processing which records each non-recorded region by the predetermined data to N record layers 52 automatically.

First, reception of the Close Session command decides the logical address recorded on the outermost circumference in each record layer 52 (step S61).

It is confirmed whether it is reproducible in reproduction mode to each logical address (step S62).

This is because reproduction may benefit the non-recorded area unstable, when the outermost circumference position shifts in each record layer 52.

Since it is necessary to make the non-recorded area record settled so that step may be kept with the sector most located in the outermost circumference as compared with other record layers 52 when reproduction is unstable, it judges whether this is possible (step S63). If this is impossible (N of step S62), it considers as the error (step S4).

The predetermined data will be recorded, if this is possible (Y of step S62) and there is the non-recorded area by the inner side of the outermost circumference address of each record layer 52 (step S64), which will realize the fourth recording unit in the claims. Thereby, the completion of each fragment is guaranteed.

Thus, since it becomes the continuation region by making all the non-recorded area to there record end, reproduction of this multilayer disk 51 is expectable with many reproducing apparatus.

The logical ad logical address which arranges the closure 72 of each record layer 52 and the start area 74 is determined (step S65), and record of the intro 73 (or the lead-in groove 61) of each record layer 52, the closure 72 (it becomes the information which indicates the next additional recording or that record is interrupted temporarily so that it may be possible (session closing)), and the start area 74 is performed (step S66), which will realizes the second recording unit in the claims.

In this case, when the data recording is interrupted temporarily, it cannot carry out scatteringly in each record layer 52, but the data recording there can be simultaneously decided in each record layer 52, and if possible, the storage capacity in each record layer 52 can be unified, and the data recording can be performed.

After the end of data recording in the processing of FIG. 7, the procedure 93 completes the data recording to the multilayer disk 51 (disk closing), which indicates that the procedure which records each non-recorded region by writing the predetermined data to the N record layers 52 automatically. This is almost the same procedure as the session closing.

First, reception of the Close Disk command decides the logical address recorded on the outermost circumference in each record layer 52 (step S71). It is confirmed whether it is reproducible in reproduction mode to each logical address (step S72).

When the outermost circumference position shifts in each record layer 52, it is because reproduction may benefit the non-recorded area unstable.

Since it is necessary to make the non-recorded area record settled so that step may be kept with the sector most located in the outermost circumference as compared with other record layers 52 when reproduction is unstable, it judges whether this is possible (step S73). If this is impossible (N of step S73), it considers as the error (step S4).

The predetermined information will be recorded, if this is possible (N of step S73) and there is the non-recorded area by the inner side of the outermost circumference address of each record layer 52 (step S74), which will achieves the fourth recording unit in the claims. Thus, the completion of each fragment is guaranteed.

Therefore, it becomes the continuation region by making all the non-recorded areas to the recording end, reproduction of this multilayer disk 51 is expectable with many reproducing apparatus.

The logical address which arranges the middle area 62 of each record layer 52 is determined (step S75), and record of the intro 73 and the area 75 (it becomes the information which shows the next additional recording or that record is completed so that it may be impossible (disk closing)), and the middle area 62 is performed (step S76), which will realize the third recording unit in the claims.

The middle area 62 becomes the region which the lead in groove 61 and lead-out 63 do in address, and divides between the record layers 52. Data recording to the perimeter is not made from the middle area 62. Since it can be made by this the completed same recording medium as the multilayer disk only for the multilayer disk 51 reproduction, improvement in reproduction compatibility is expectable.

FIG. 9 shows an example of the dialog displayed on the host computer 21. The user is allowed, at the time of the start of the recording to the multilayer disk 51, to selectively determine whether the additional recording is used, by displaying this dialog.

It can choose making it record of the limitation at once by being able to choose being able to add the record to be performed from now on and performing it by choosing the button 101, and choosing the button 102. By this selection, it is determined which of the procedures 92 and 93 is performed.

Thereby, when recording the CPU 22 on the multilayer disk 51, and the next additional recording is performed for the record concerned possible, or (session closing) instruction of no or (disk closing) are received from the user (receiving unit) and the former instruction are received, the additional recording concerned will direct to record possible to the optical disk drive 1, which will realize the second instruction unit in the claims.

Figure 10:
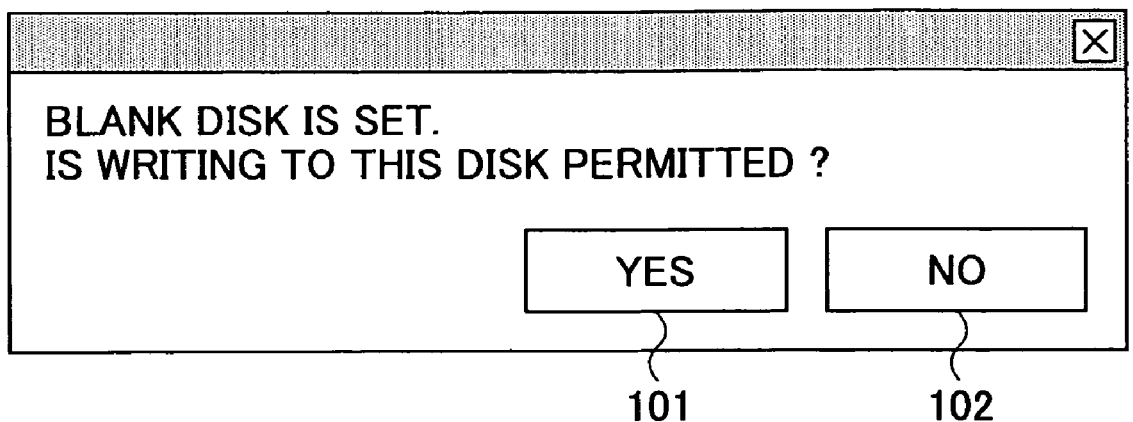
FIG. 10 is a diagram showing an example of a dialog displayed on the host computer.
Figure 11:
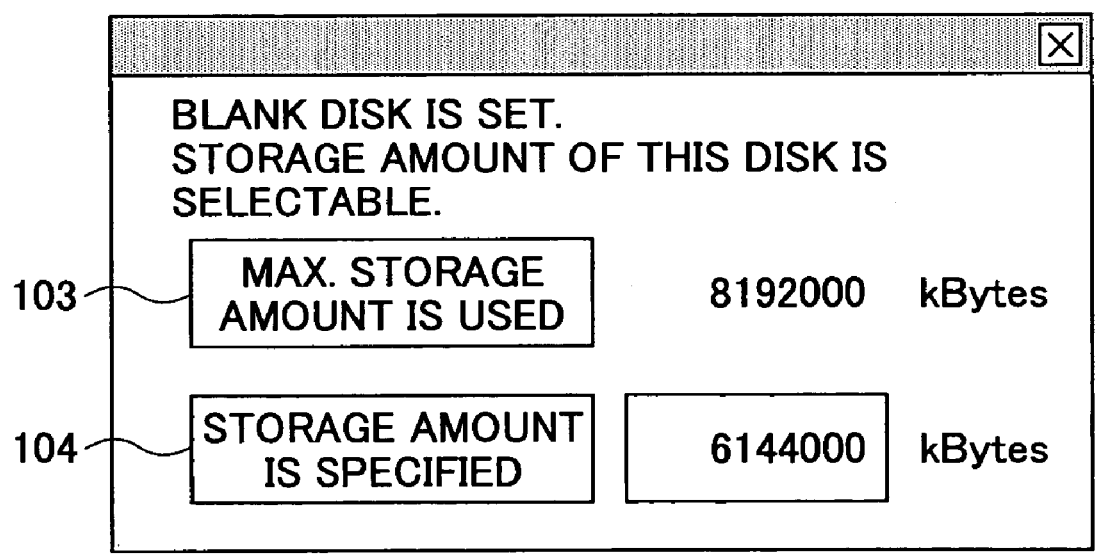
FIG. 11 is a diagram showing an example of another dialog displayed on the host computer.

It continues at this, and if the user enables it to specify storage capacity in the dialog shown in FIG. 10, it will become the device which is further easy to use.

When the button 103 is chosen, the maximum capacity of the multilayer disk 51 is used, and when the button 104 is chosen, the user specifies the desired storage capacity.

In addition, although the above explanation explained the example in case the multilayer disk 51 is the optical disk, it is not overemphasized, and the multilayer recording medium treated by the present invention may be the magneto-optic disk etc.

The present invention is not limited to the above-described embodiments, and variations and modifications may be made without departing from the scope of the present invention.

What is claimed is:

1. An information recording method which records information to a multilayer recording medium in which a number of record layers are laminated and recording of information to each record layer is possible, comprising:

dividing, when an amount of the information being recorded to the medium does not exceed a maximum amount of information which can be recorded to the medium, the information being recorded to the medium into data blocks by the number of the record layers; and recording the data blocks to data areas of the respective record layers so that the recording areas of the record layers where the data blocks are recorded are overlapped each other with respect to a thickness direction of the medium.

2. The information recording method according to claim 1 wherein the dividing is performed to divide the amount of the information being recorded to the medium into substantially equal amounts of the data blocks by the number of record layers, and the recording is performed so that most of the recording areas of the record layers where the data blocks are recorded have no regions which are not overlapped each other with respect to the thickness direction of the medium.

3. The information recording method according to claim 2 wherein, when regions which are not overlapped each other with respect to the thickness direction of the medium exist as a result of the recording, predetermined data is recorded to the regions so that all the recording areas of the record layers where the data blocks are recorded are overlapped each other with respect to the thickness direction of the medium.

4. The information recording method according to claim 2 wherein the method comprises specifying at least an address of one of the record layers where the recording of the data blocks to the data areas of the respective record layers is performed first among the respective record layers, to inhibit the recording of the data blocks to subsequent addresses of said one of the record layers following the specified address.

5. The information recording method according to claim 1 wherein, when a predetermined write error occurs during the recording of the data blocks to the respective record layers, the recording is finished after predetermined data is recorded to the respective record layers.

6. The information recording method according to claim 1 wherein, when the recording of the data blocks to the respective record layers is interrupted to permit additional recording of the medium to restart later, information which indicates the interruption of the recording is recorded to the respective record layers.

7. The information recording method according to claim 1 wherein, when the recording of the data blocks to the respective record layers is finished to inhibit additional recording of the medium from restarting later, predetermined data is recorded to all non-recorded regions of the record layers, and information which indicates the end of the recording is recorded to the respective record layers.

8. The information recording method according to claim 1 wherein, when the recording of the data blocks to the respective record layers is interrupted or finished and non-recorded regions exist in a range of addresses of the recording areas of the record layers where the data blocks are recorded, predetermined data is recorded to the non-recorded regions.

9. An information recording device which records information to a multilayer recording medium in which a number of record layers are laminated and recording of information to each record layer is possible,
wherein, when an amount of the information being recorded to the medium does not exceed a maximum amount of information which can be recorded to the medium, the information being recorded to the medium is divided into data blocks by the number of the record layers,
the information recording device comprising:
a first recording unit recording the data blocks to data areas of the respective record layers so that the recording areas of the record layers where the data blocks are recorded are overlapped each other with respect to a thickness direction of the medium.

10. The information recording device according to claim 9 wherein the amount of the information being recorded to the medium is divided into substantially equal amounts of the data blocks by the number of record layers, and the first recording unit is provided to perform the recording so that most of the recording areas of the record layers where the data blocks are recorded have no regions which are not overlapped each other with respect to the thickness direction of the medium.

11. The information recording device according to claim 10 wherein, when regions which are not overlapped each other with respect to the thickness direction of the medium exist as a result of the recording, the first recording unit records predetermined data to the regions so that all the recording areas of the record layers where the data blocks are recorded are overlapped each other with respect to the thickness direction of the medium.

12. The information recording device according to claim 10 wherein the first recording unit is provided to specify at least an address of one of the record layers where the recording of the data blocks to the data areas of the respective record layers is performed first among the respective record layers, to inhibit the recording of the data blocks to subsequent addresses of said one of the record layers following the specified address.

13. The information recording device according to claim 9 wherein, when a predetermined write error occurs during the recording of the data blocks to the respective record layers, the first recording unit finishes the recording after predetermined data is recorded to the respective record layers.

14. The information recording device according to claim 9 further comprising a second recording unit recording, when the recording of the data blocks to the respective record layers is interrupted to permit additional recording of the medium to restart later, information which indicates the interruption of the recording to the respective record layers.

15. The information recording device according to claim 9 further comprising a third recording unit recording, when the recording of the data blocks to the respective record layers is finished to inhibit additional recording of the medium from restarting later, predetermined data to all non-recorded regions of the record layers, and information which indicates the end of the recording to the respective record layers.

16. The information recording device according to claim 9 further comprising a fourth recording unit recording, when the recording of the data blocks to the respective record layers is interrupted or finished and non-recorded regions exist in a range of addresses of the recording areas of the record layers where the data blocks are recorded, predetermined data the non-recorded regions.

17. An information recording system in which an information recording device and a host computer connected to the information recording device are provided, the information recording device recording information to a multilayer recording medium in which a number of record layers are laminated and recording of information to each record layer is possible,
the host computer comprising a first instruction unit deciding an amount of information being recording to the medium, and dividing, when the amount of the information does not exceed a maximum amount of information which can be recorded to the medium, the information being recorded to the medium into data blocks by the number of record layers, and the first instruction unit sending a request for recording the data blocks to the respective record layers of the medium to the information recording device,
the information recording device comprising a first recording unit recording the data blocks to data areas of the respective record layers so that the recording areas of the record layers where the data blocks are recorded are overlapped each other with respect to a thickness direction of the medium.

18. The information recording system according to claim 17 wherein the information recording system comprises:
a receiving unit receiving, when recording the information to the medium using the information recording device, from a user an instruction on whether additional recording of the medium is permitted to restart later; and
a second instruction unit instructing, when the instruction is received, the information recording device to perform the recording of the information to the medium to permit the additional recording of the medium to restart later.

19. A computer program product embodied therein for causing a computer to execute an information recording method with an information recording system in which an information recording device and a host computer connected to the information recording device are provided, the information recording device recording information to a multilayer recording medium in which a number of record layers are laminated and recording of information to each record layer is possible, the information recording method comprising:
deciding an amount of information being recording to the medium;

dividing, when the amount of the information does not exceed a maximum amount of information which can be recorded to the medium, the information being recorded to the medium into data blocks by the number of record layers;

sending a request for recording the data blocks to the respective record layers of the medium to the information recording device; and recording the data blocks to data areas of the respective record layers so that the recording areas of the record layers where the data blocks are recorded are overlapped each other with respect to a thickness direction of the medium.

20. The computer program product according to claim 19 wherein the information recording method comprising:

receiving, when recording the information to the medium using the information recording device, from a user an instruction on whether additional recording of the medium is permitted to restart later; and instructing, when the instruction is received, the information recording device to perform the recording of the information to the medium to permit the additional recording of the medium to restart later.

* * * * *